(12) United States Patent
Judkins et al.

(10) Patent No.: US 10,498,012 B2
(45) Date of Patent: Dec. 3, 2019

(54) ELECTRONIC DEVICE HAVING ANTENNA TUNING CIRCUITS WITH SHARED CONTROL INTERFACE CIRCUITRY

(71) Applicant: Apple Inc., Cupertino, CA (US)

(72) Inventors: James G. Judkins, Campbell, CA (US); Jing Zhu, Santa Clara, CA (US); Liang Han, Sunnyvale, CA (US); Matthew A. Mow, Los Altos, CA (US); Ming-Ju Tsai, Sunnyvale, CA (US); Thomas E. Biedka, San Jose, CA (US); Victor C. Lee, Sunnyvale, CA (US); Xu Han, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 15/655,251

(22) Filed: Jul. 20, 2017

(65) Prior Publication Data

US 2019/0027809 A1 Jan. 24, 2019

(51) Int. Cl.
*H01Q 1/24* (2006.01)
*H04B 1/04* (2006.01)
(Continued)

(52) U.S. Cl.
CPC ........ *H01Q 1/243* (2013.01); *H04B 1/0458* (2013.01); *H04B 1/18* (2013.01); *H04B 1/40* (2013.01); *H04W 88/06* (2013.01)

(58) Field of Classification Search
CPC ........ H01Q 1/243; H04B 1/0458; H04B 1/18; H04B 1/40
(Continued)

(56) References Cited

U.S. PATENT DOCUMENTS 8,971,874 B2   3/2015  Han et al.
9,041,617 B2   5/2015  Sorensen et al.
(Continued)

OTHER PUBLICATIONS

Yang et al., Frequency-Reconfigurable Antennas for Multiradio Wireless Platforms, IEEE microwave magazine, Feb. 2009, pg. 66-83.
(Continued)

*Primary Examiner* — Ayodeji O Ayotunde
(74) *Attorney, Agent, or Firm* — Treyz Law Group, P.C.; Michael H. Lyons (57) ABSTRACT

An electronic device may be provided with wireless circuitry that includes one or more antennas and a transceiver. An integrated circuit may be coupled between the transceiver and the antenna and may include multiple tunable components such that tune the response of the antenna. The control signals may be generated by a tuning controller external to the integrated circuit. Shared control interface circuitry may be formed on the integrated circuit for interfacing between the tuning controller and each of the tunable components on the integrated circuit. The control interface circuitry may include a conductive path and decoupling circuitry that routes the control signals to corresponding control inputs on each of the tunable components. Sharing the control interface circuitry between each tunable component on the integrated circuit may minimize the space required on the integrated circuit for controlling the response of the antenna.

20 Claims, 7 Drawing Sheets

(51) Int. Cl.
*H04B 1/18* (2006.01)
*H04B 1/40* (2015.01)
*H04W 88/06* (2009.01)

(58) Field of Classification Search
USPC .......................................................... 455/77
See application file for complete search history.

(56) References Cited

U.S. PATENT DOCUMENTS

| | | |
|---|---|---|
| 9,130,279 B1 | 9/2015 | Lee et al. |
| 9,236,663 B2 | 1/2016 | Akhi et al. |
| 9,246,223 B2 | 1/2016 | Badaruzzaman et al. |
| 9,391,582 B2 | 6/2016 | Desclos |
| 9,484,766 B2 | 11/2016 | Wheeland et al. |
| 9,523,727 B2 | 12/2016 | Han et al. |
| 9,698,854 B2 | 7/2017 | Mow et al. |
| 2014/0011460 A1* | 1/2014 | Ali ........................ H01Q 1/243 455/75 |
| 2015/0380812 A1* | 12/2015 | Black .................... H01Q 1/243 343/861 |
| 2016/0174293 A1 | 6/2016 | Mow et al. |

OTHER PUBLICATIONS

Jiang et al., U.S. Appl. No. 15/257,521, filed Sep. 6, 2016.

* cited by examiner

ELECTRONIC DEVICE HAVING ANTENNA TUNING CIRCUITS WITH SHARED CONTROL INTERFACE CIRCUITRY

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, the presence of conductive structures can influence antenna performance. For example, the presence of conductive housing structures or other device structures may limit the volume available for implementing antennas. This can adversely affect antenna bandwidth. Antenna tuning techniques may be used to compensate for limited antenna bandwidth, but unless a tunable antenna is operated appropriately, antenna performance may be degraded due to nonlinearities and detuning effects. In addition, as electronic devices become smaller over time, if care is not taken, antenna tuning circuitry can occupy an excessive amount of the valuable area within an electronic device.

It would therefore be desirable to be able to provide improved wireless circuitry for electronic devices such as improved antenna tuning circuitry.

SUMMARY

An electronic device may be provided with wireless circuitry. The wireless circuitry may include one or more antennas. An antenna may have an antenna feed that is coupled to a radio-frequency transceiver with a transmission line. An antenna tuning integrated circuit may be coupled between the radio-frequency transceiver and the antenna. The antenna tuning integrated circuit may include multiple tunable components such as adjustable inductors and adjustable capacitors that are adjusted using control signals to tune the antenna. The integrated circuit may be mounted to a substrate such as a laminate substrate.

The control signals may be generated by a tuning controller external to the integrated circuit. Shared control interface circuitry may be formed on the integrated circuit for interfacing between the tuning controller and each of the tunable components on the integrated circuit. The shared control interface circuitry may convey the control signals from the tuning controller to each of the tunable components on the integrated circuit. The shared control interface circuitry may include, for example, a conductive path and/or decoupling circuitry that routes the control signals to corresponding control inputs on each of the tunable components. The control signals may include bias voltages, clocking signals, digital data bits that identify a state for the tunable components, or other control signals. By sharing the control interface circuitry between each tunable component on the integrated circuit (e.g., for each control signal that is used), separate interface circuits need not be formed on the integrated circuit for each tunable component, thereby minimizing the space required on the integrated circuit for controlling the response of the antenna.

DETAILED DESCRIPTION

Figure 1:
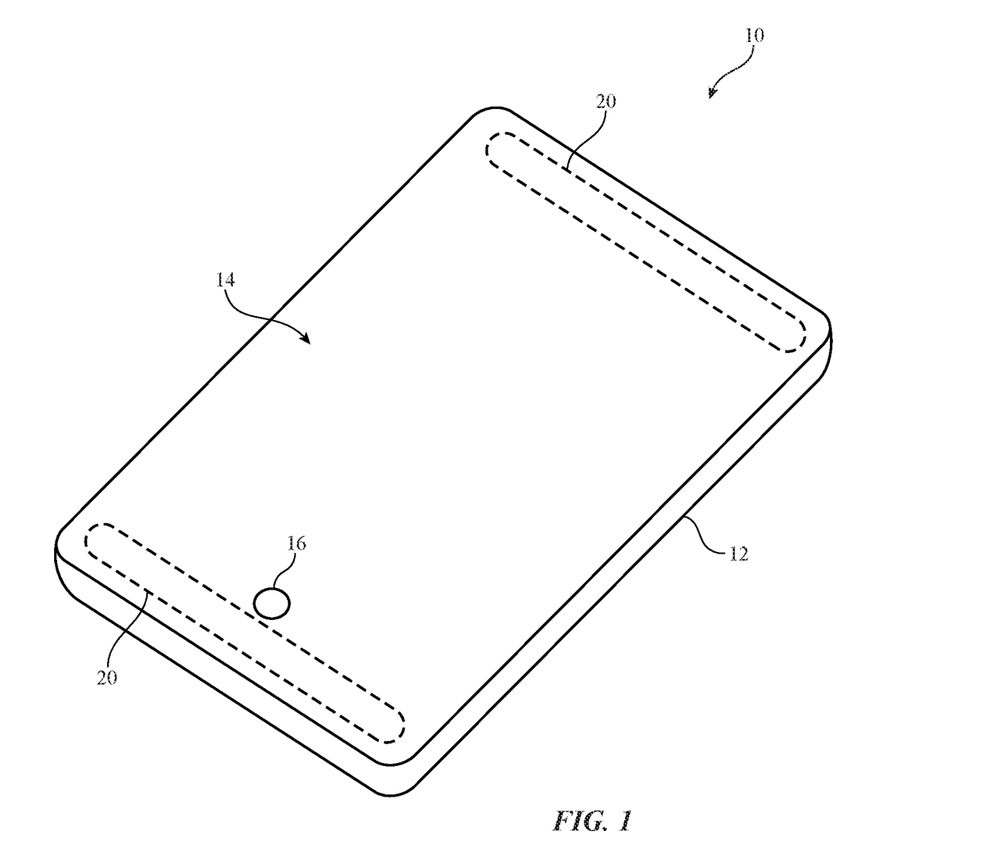
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. Tunable circuits may be used to adjust the wireless circuitry. Multiple tunable circuits may be formed on the same integrated circuit. Shared control interface circuitry may be formed on the integrated circuit and shared between the tunable circuits on the integrated circuit. Control circuitry may control the tunable circuits via the shared control interface circuitry to adjust a frequency response of a corresponding antenna. By sharing control interface circuitry between multiple antenna tuning circuits on the integrated circuit, the amount of space required on the integrated circuit for controlling antenna tuning may be less than in scenarios where each antenna tuning circuit is controlled using a respective control interface circuit.

The wireless circuitry of device 10 may, for example, include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). If desired, device 10 may also contain wireless communications circuitry for implementing near-field communications, light-based wireless communications, or other wireless communications (e.g., communications at 13.56 MHz, communications at 60 GHz, etc.).

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a keyboard, a gaming controller, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.). Openings in housing 12 may also be formed for audio components such as a speaker and/or a microphone.

Antennas may be mounted in housing 12. For example, housing 12 may have four peripheral edges as shown in FIG. 1 and one or more antennas may be located along one or more of these edges. As shown in the illustrative configuration of FIG. 1, antennas may, if desired, be mounted in regions 20 along opposing peripheral edges of housing 12 (as an example). Antennas may also be mounted in other portions of device 10, if desired. The configuration of FIG. 1 is merely illustrative.

Antennas may be mounted at the corners of housing 12, along the peripheral edges of housing 12, on the rear of housing 12, under the display cover glass or other dielectric display cover layer that is used in covering and protecting display 14 on the front of device 10, under a dielectric window on a rear face of housing 12 or the edge of housing 12, or elsewhere in device 10.

Housing 12 may include conductive housing structures. The conductive housing structures may include peripheral structures such as peripheral conductive housing structures that run around the periphery of device 10. The peripheral conductive housing structures may serve as a bezel for a planar structure such as a display, may serve as sidewall structures for housing 12, may have portions that extend upwards from an integral planar rear housing (e.g., to form vertical planar sidewalls or curved sidewalls), and/or may form other housing structures.

Gaps may be formed in the peripheral conductive housing structures that divide the peripheral conductive housing structures into peripheral segments. One or more of the segments may be used in forming one or more antennas for electronic device 10 (e.g., to form an antenna resonating element arm for one or more antennas). Antennas may also be formed using an antenna ground plane formed from conductive housing structures such as metal housing midplate structures and other internal device structures. Rear housing wall structures may be used in forming antenna structures such as an antenna ground.

Figure 2:
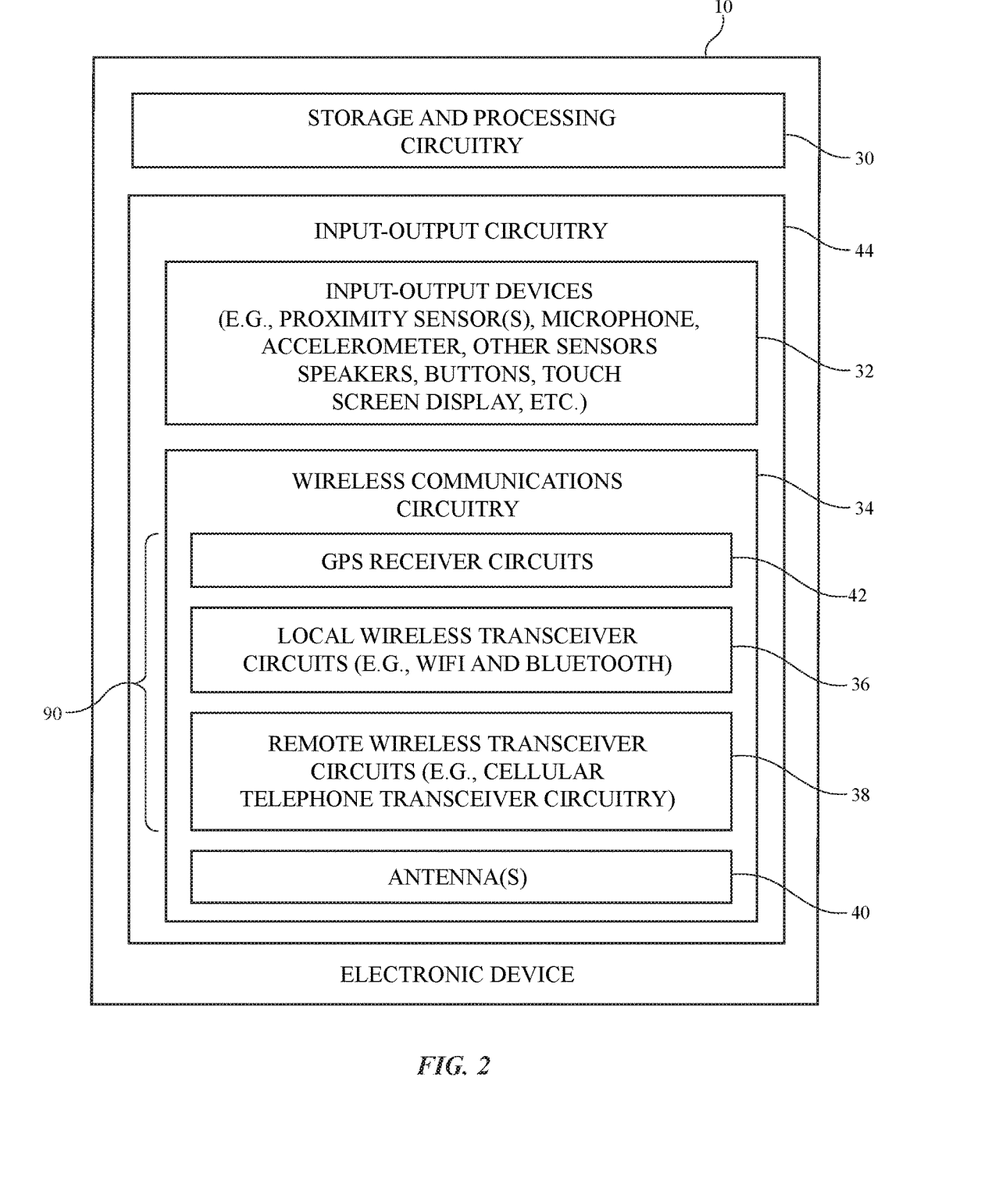
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band or other wireless personal area network and/or wireless local area network bands.

Circuitry 34 may use cellular telephone transceiver circuitry 38 for handling wireless communications in frequency ranges such as a low communications band from 600 to 960 MHz, a midband from 1710 to 2170 MHz, and a high band from 2300 to 2700 MHz or other communications bands between 700 MHz and 2700 MHz or other suitable frequencies between 600 MHz and 4000 MHz (as examples). Circuitry 38 may handle voice data and non-voice data.

Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc.

Wireless communications circuitry 34 may include satellite navigation system circuitry such as global positioning system (GPS) receiver circuitry 42 for receiving GPS signals at 1575 MHz or for handling other satellite positioning data (e.g., GLONASS signals at 1609 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles. Satellite navigation system signals for receiver 42 are received from a constellation of satellites orbiting the earth.

Wireless communications circuitry 34 may include one or more antennas 40. Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals).

Transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while the other antenna(s) may be switched out of use. If desired, control circuitry 30 may be used to select an optimum antenna to use in device 10 in real time and/or an optimum setting for tunable wireless circuitry associated with one or more of antennas 40. Sensors may be incorporated into device 10 to gather sensor data in real time that is used in adjusting antennas 40.

Figure 3:
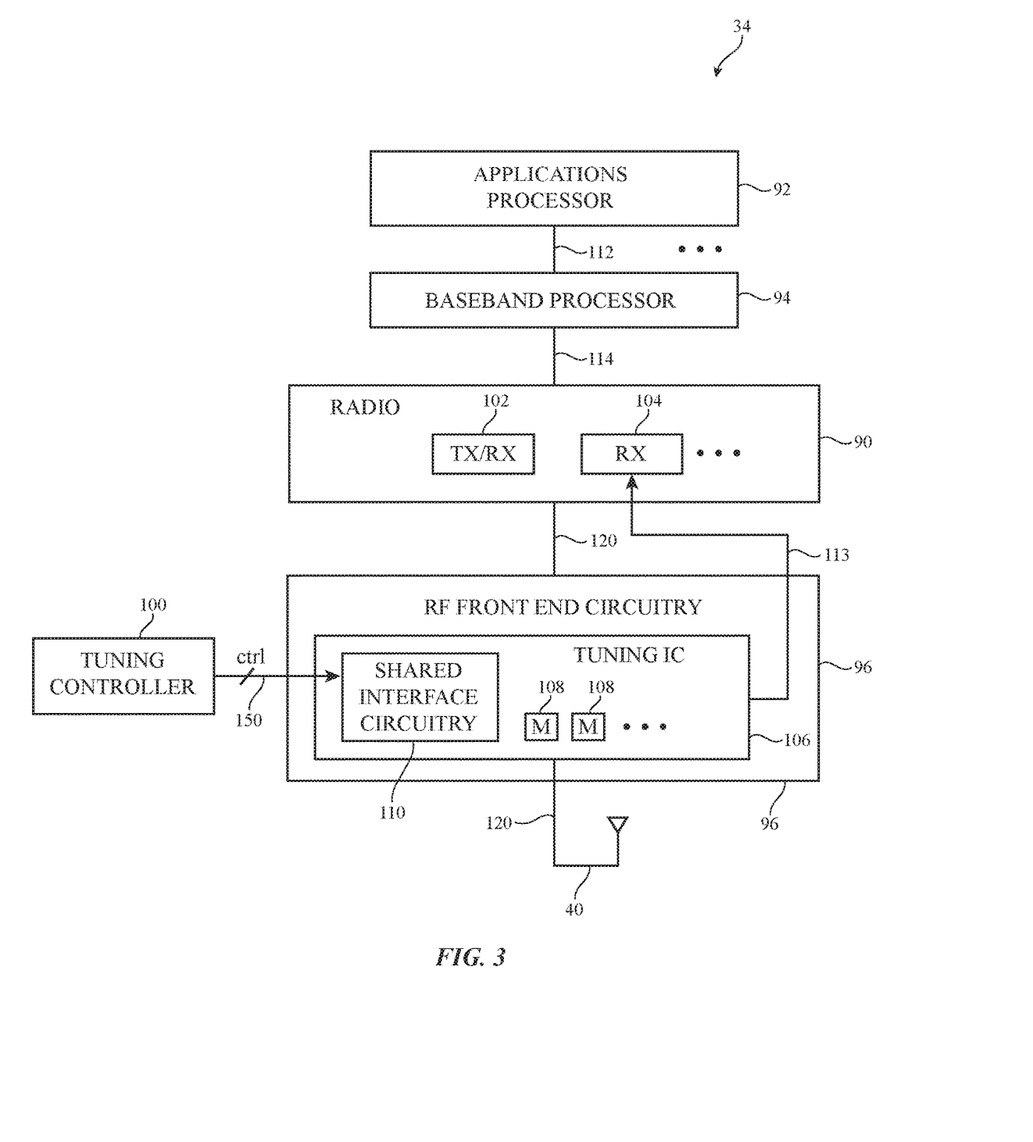
FIG. 3 is a schematic diagram of illustrative wireless communications circuitry in which a tuning controller controls multiple antenna tuning circuits using shared control interface circuitry in accordance with an embodiment.

As shown in FIG. 3, wireless circuitry 34 may include one or more baseband processors such as baseband processor 94. Baseband processor 94 may, for example, contain hardwired circuitry that accelerates wireless communications tasks (e.g., implementation of computationally intensive signal processing algorithms) that would be impractical to handle on a general purpose processor such as application processor 92.

Application processor 92 may be a system-on-chip integrated circuit or other processor integrated circuit. Application processor 92 may be used to execute code such as operating system code and application software (e.g., as a portion of storage and processing circuitry 30 of FIG. 2 or as a separate processor). During operation of device 10, application processor 92 may use device components (e.g., components 32 of FIG. 2) to gather input from a user, environmental sensor input data, and other input data. The input may be processed by application processor 92 and suitable output data provided. The output data that is generated by application processor 92 may be presented to a user, may be transmitted over a wired communications path, or may be wirelessly transmitted using wireless circuitry 34. Application processor 92 may also be used to process data that has been wirelessly received using wireless circuitry 34.

Application processor 92 may communicate with baseband processor 94 over path 112. Baseband processor 94 may communicate with radio-frequency transceiver circuitry 90 (sometimes referred to herein as radio circuitry 90 or radio 90) over path 114. Paths 112 and 114 may be digital communications buses and/or analog signal paths. Examples of digital communications buses that may be used for paths 112 and 114 include the Peripheral Component Interconnect Express (PCIE) bus, the RF Front-End Control Interface (RFFE) bus, the Serial Peripheral Interface (SPI) bus, the Universal Serial Bus (USB) bus, a local area network (LAN) bus such as an Ethernet bus, etc.

Baseband processor 94 may include processors and communications interface circuitry. Processors in baseband processor 94 may, for example, be used in implementing upper layer communications protocols (i.e., protocols above the physical layer in the wireless protocol stack). Physical layer processing activities may be handled by hardwired circuitry in baseband processor 94 (e.g., circuitry that is configured to handle computationally intensive activities such as computationally intensive signal processing algorithms). Communications interface circuitry in baseband processor 94 may be used to support digital communications with radio-frequency transceiver circuitry 90 (e.g., in scenarios where path 114 is a digital bus).

During operation, radio-frequency transceiver circuitry 90 may place baseband signals from processor 94 that are to be transmitted on a desired carrier frequency band and may extract incoming signals from a carrier frequency band (i.e., signals received from antenna 40) so that those extracted baseband signals can be provided to baseband processor 94. Transceiver circuitry 90 may include analog-to-digital converter (ADC) circuitry that converts analog signals received from antenna 40 into digital signals that are conveyed to baseband processor 94 over path 114. Transceiver circuitry 90 may include digital-to-analog converter (DAC) circuitry that converts digital signals received from baseband processor 94 into analog signals that are transmitted by antenna 40.

Radio-frequency transceiver circuitry 90 may be coupled to a corresponding antenna 40 over transmission line 120 (e.g., a coaxial cable, microstrip transmission line, or other radio-frequency transmission line). Radio-frequency front end circuitry 96 may be interposed on transmission line 120 between circuitry 90 and antenna 40. Front end circuitry 96 may sometimes be referred to herein as front end module 96.

Radio-frequency transceiver circuitry 90 may include transceiver circuitry such as transceiver 102 (e.g., transceiver circuits such as circuits 42, 36, and/or 38 of FIG. 2) for transmitting and receiving radio-frequency signals through front end circuitry 96 and antenna 40. Front-end circuitry 96 may contain impedance matching circuitry and filter circuitry. Antenna 40 may contain an antenna resonating element such as an inverted-F antenna resonating element, a slot antenna resonating element, a patch antenna resonating element, a loop antenna resonating element, monopole antenna structures, dipole antenna structures, near-field communications antenna structures, or other antenna structures.

To provide antenna 40 with the ability to cover communications frequencies of interest, front end circuitry 96 and antenna 40 may contain tunable circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, front end circuitry 96 may be provided with adjustable components such as tuning circuits 108 to tune antenna 40 over communications bands of interest. Tuning circuits 108 may include tunable inductors, tunable capacitors, or other tunable components. Tuning circuits such as these may be based on switches and networks of fixed components, distributed metal structures that produce associated distributed capacitances and inductances, variable solid state devices for producing variable capacitance and inductance values, tunable filters, or other suitable tunable structures. Tuning circuits 108 may be adjustable (e.g., may have variable inductance values, capacitance values, or other parameters associated) or may be fixed (not tunable).

Tuning controller 100 may generate tuning control signals ctrl that control tuning circuits 108 to tune antenna 40 and may provide control signals ctrl to tuning circuits 108 over control paths 150 to tune the frequency response and/or efficiency of antenna 40. Control signals ctrl may, for example, adjust the state of tuning circuits 108 so that tuning circuits 108 provide selected impedances (e.g., desired capacitances, inductances, resistances, etc.) between different locations within circuitry 96. Adjusting the impedances of tuning circuits 108 may, for example, adjust the frequency response or antenna efficiency of antenna 40 (e.g., tuning circuits 108 may form adjustable impedance matching circuitry for antenna 40 that is adjusted to adjust the impedance of antenna 40). Tuning circuits 108 may sometimes be referred to herein as tunable components 108, tuning components 108, tunable circuits 108, adjustable impedance matching circuits 108, adjustable impedance matching components 108, antenna tuning circuits 108, or tuning (tuner) modules (M) 108. Control signals ctrl may include, for example, bias voltages (e.g., for powering active components in circuits 108), interface input-output (I/O) voltages, clock signals for clocking circuits 108, and/or data signals that are conveyed over separate conductive lines and that instruct circuits 108 to be placed into a particular state.

If desired, multiple antenna tuning circuits 108 may be formed on the same substrate (e.g., rigid or flexible printed board substrate), package (e.g., printed circuit or integrated circuit package), module, or integrated circuit within front end circuitry 96. In the example of FIG. 3, tuning circuits 108 are each formed on a single shared integrated circuit (IC) 106. Integrated circuit 106 (sometimes referred to herein as tuning IC 106 or chip 106) may be, for example, a silicon-on-insulator integrated circuit, a silicon integrated circuit die, or other integrated circuit.

Tuning IC 106 may include control interface circuitry that interfaces between tuning controller 100 and control inputs of tuning circuits 108. The control interface circuitry in tuning IC 106 may, for example, receive control signals ctrl from tuning controller 100, may filter the received control signals, and/or may route the control signals to corresponding tuning circuits 108 on IC 106 (e.g., to place circuits 108 in desired states for exhibiting desired impedances).

In some scenarios, separate interface circuits are provided for conveying control signals ctrl to different respective tuning circuits 108. However, forming separate interface circuits in this way may occupy an excessive amount of area on tuning IC 106 and within device 10. If desired, the space required within tuning IC 106 for controlling tuning components 108 may be reduced by providing tuning IC 106 with shared control interface circuitry such as shared control interface circuitry 110.

Shared control interface circuitry 110 may include shared circuitry that is used to interface between tuning controller 100 and every tuning circuit 108 on tuning IC 106. For example, shared control interface circuitry 106 may include filter circuitry, routing circuitry (e.g., conductive paths or switches), and/or filtering circuitry that is shared by each tuning circuit 108 in receiving control signals ctrl from tuning controller 100. By sharing the interface circuitry between each tuning circuit 108, separate interface circuits need not be formed for each tuning circuit 108, thereby reducing the overall space within device 10 required for controlling circuits 108. Shared control interface circuitry 110 may sometimes be referred to herein as shared interface circuitry, shared interfacing circuitry, shared biasing circuitry, shared clocking circuitry, shared bias circuitry, tuning control interface circuitry, or tuner control interface circuitry.

Tuning controller 100 may be formed as a part of front end circuitry 96 (e.g., on the same substrate as front end circuitry 96), on tuning IC 106, on a separate substrate from front end circuitry 96 such as on a separate integrated circuit used for controlling the tuning of antenna 40 (sometimes referred to herein as a tuning controller integrated circuit or tuning controller IC), as a part of baseband processor 94, as a part of applications processor 92, and/or as a part of storage and processing circuitry 30 of FIG. 2. Radio-frequency transceiver circuitry 90 may be formed on the same substrate (e.g., printed circuit), package, module, or integrated circuit as baseband processor 94, applications processor 92, and/or front end 96 or two or more of transceiver circuitry 90, baseband processor 94, applications processor 92, and front end 96 may be formed on different substrates, packages, modules, or integrated circuits.

If desired, one or more of tuning circuits 108 in tuning IC 106 may be used in making impedance measurements (e.g., complex phase and magnitude measurements such as scattering or S-parameter measurements). For example, one or more of components 108 may include a sensor such as a radio-frequency coupler (e.g., a directional coupler or reflectometer). During impedance measurements, radio-frequency transceiver 90 may transmit signals toward antenna 40. Transmitted signals may be reflected from antenna 40. The directional coupler in circuits 108 may be configured to tap into the transmitted and reflected signals passing between tunable front-end module 96 and tunable antenna 40.

Radio-frequency circuitry 90 may include receiver circuitry 104 that receives signals from the directional coupler in components 108 via feedback path 113 (e.g., signals from transceiver 102 and/or antenna 40 depending on the state of switching circuitry in the coupler). By processing the signal measurements made using receiver 104, the impedance of antenna 40 (or other suitable portion of wireless circuitry 34) may be determined. The impedance measurements that are made in this way using radio-frequency transceiver circuitry 90 and coupler circuitry in tuning IC 106 may be used in determining whether antenna 40 has been detuned due to the presence of external objects in the vicinity of antenna 40 or other environmental factors.

In general, directional couplers such as a coupler within tuning circuits 108 may be used to provide real-time impedance information on any suitable portion of wireless circuitry 34 (e.g., the impedance of a portion of antenna 40, the impedance of a matching circuit, the impedance of a transmission line, etc.). With an arrangement of the type shown in FIG. 3, impedance data (e.g., S-parameter measurements for calculating antenna impedance) may be provided from receiver 104 to baseband processor 94. Control circuitry 30, tuning controller 100, and/or applications processor 92 may receive and process the impedance data from baseband processor 94. Antenna impedance information may also be provided from receiver 104 to tuning controller 100, applications processor 92, and/or control circuitry 30 using other signal paths. Receiver 104 and transceiver circuitry 102 may be formed on the same integrated circuit, substrate (e.g., printed circuit), module, or package or may be formed on separate integrated circuits, substrates, modules, or packages.

The example of FIG. 3 is merely illustrative. If desired, additional tuning circuits 108 may be formed within front end circuitry 96 without being formed on integrated circuit 106. Tuning circuits 108 on integrated circuit 106 may, for example, include switching circuitry coupled to tuning circuits 108 formed within front end 96 but external to integrated circuit 106. If desired, applications processor 92 may be coupled to multiple baseband processors 94 via respective paths 112 and each baseband processor may be coupled to a respective radio-frequency transceiver, front end module, and antenna. If desired, multiple baseband processors may convey signals over one or more of the same antennas 40. Tuning controller 100 may additionally control front end circuitry coupled to other baseband processors. Controller 100 may control adjustable tuning circuits within antenna 40. If desired, baseband processor 94 of FIG. 3 may be coupled to multiple antennas 40 (e.g., via a single front end module 96 or via multiple front end modules 96). Transceivers 102 in circuitry 90 as shown in FIG. 3 may include zero, one, or more than one of each of transceiver circuits 42, 36, and 38 of FIG. 2. Tuning circuits 108 and shared interface circuitry 110 need not be formed on the same integrated circuit. If desired, tuning circuits 108 and shared interface circuitry 110 may be formed on the same substrate (e.g., a plastic or epoxy substrate), rigid or flexible printed circuit board, IC package, etc.

Tuning circuits 108 may be adjusted to adjust the performance of antenna 40 during operation of device 10. Control circuitry 100 may adjust tuning circuits 108 using control signals ctrl to adjust the impedance of antenna 40 (e.g., circuits 108 may form adjustable impedance matching circuitry for antenna 40) to cover desired frequencies. In practice, the presence of an external object in the vicinity of antenna 40 may detune antenna 40. Using circuitry such as circuits 108, antenna 40 can be adjusted to compensate for loading experienced due to the presence of the external object.

Figure 4:
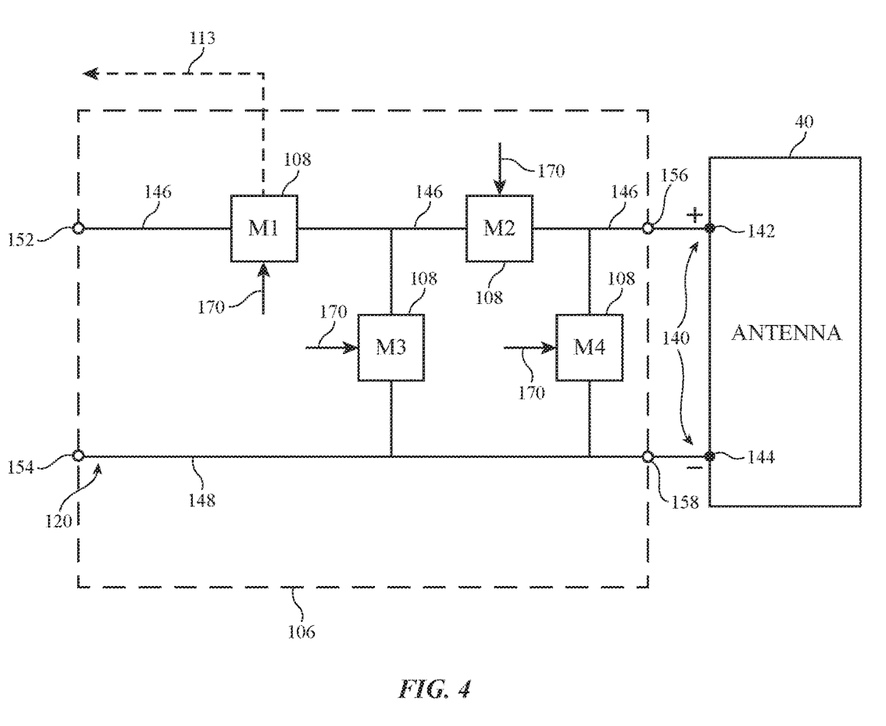
FIG. 4 is a diagram of illustrative antenna tuning circuitry such as tunable impedance matching circuitry in accordance with an embodiment.

FIG. 4 is a circuit diagram showing an example of how tuning circuits 108 on tuning IC 106 may be coupled between transceiver circuitry 90 and antenna 40 (e.g., for adjusting the impedance of antenna 40 to tune or adjust the response of antenna 40).

As shown in FIG. 4, radio-frequency transmission line 120 may include a positive signal conductor such as line 146 and a ground signal conductor such as line 148. Lines 146 and 148 may form parts of a coaxial cable or a microstrip transmission line (as examples). As one example, lines 146 and 148 may be formed from conductive traces on a printed circuit substrate or an integrated circuit such as integrated circuit 106. Positive conductor 146 may be coupled to transceiver circuitry 90 (FIG. 3) over conductive interconnect 152 and ground conductor 148 may be coupled to transceiver circuitry 90 over conductive interconnect 154.

Tuning circuits 108 may be interposed within transmission line 120 on integrated circuit 106. For example, tuning circuits 108 may include tuning circuits interposed on one of line 146 or line 148 and circuits coupled between lines 146 and 148. When provided on transmission line 120 on integrated circuit 106, tuning circuits 108 may form an adjustable impedance matching network (adjustable impedance matching circuitry) used in matching the impedance of antenna 40 to the impedance of transmission line 120 at a desired frequency. Circuits 108 may be provided as discrete components (e.g., surface mount technology components) or may be formed from housing structures, printed circuit board structures, traces on plastic supports, etc.

Transmission line 120 may be coupled to antenna feed structures associated with antenna 40. As an example, antenna 40 may form an inverted-F antenna, a slot antenna, a hybrid inverted-F slot antenna or other antenna having an antenna feed 140 with a positive antenna feed terminal such as terminal 142 (e.g., a feed terminal on the antenna resonating element for antenna 40) and a ground antenna feed terminal such as ground antenna feed terminal 144 (e.g., a feed terminal on the antenna ground for antenna 40). Positive transmission line conductor 146 may be coupled to positive antenna feed terminal 142 through conductive interconnect 156 on integrated circuit 106 and ground transmission line conductor 148 may be coupled to ground antenna feed terminal 144 through conductive interconnect 158 on integrated circuit 106. Other types of antenna feed arrangements may be used if desired. The illustrative feeding configuration of FIG. 4 is merely illustrative.

Conductive interconnects 152, 154, 156, and 158 may include any desired conductive interconnect structures for coupling lines 146 and 148 to circuitry external to integrated circuit 106. For example, conductive interconnects 152, 154, 156, and 158 may include contact pads, solder balls, micro bumps, conductive pins, solder, conductive adhesive, conductive wires, vertical conductive vias, conductive springs, conductive welds, conductive housing structures, or any other desired conductive structures.

In the example of FIG. 4, a first tuning circuit 108 (e.g., tuning circuit M1) and a second tuning circuit 108 (e.g., tuning circuit M2) may be provided on line 146 and coupled in series between interconnect 152 and interconnect 156. A third tuning circuit 108 (e.g., tuning circuit M3) may be coupled between line 148 and a node on line 146 that is interposed between circuits M1 and M2. A fourth tuning circuit 108 (e.g., tuning circuit M4) may be coupled between lines 146 and 148 at a location between circuit M2 and feed 140 (e.g., circuits M3 and M4 may be shunt components such as shunt inductors or shunt capacitors coupled between lines 146 and 148).

Tuning circuits M1, M2, M3, and M4 may include one or more capacitors, series inductors, resistors, and/or switching circuits formed in or on integrated circuit 106 (e.g., within layers of an integrated circuit substrate such as a semiconductor substrate of integrated circuit 106, as traces or surface mount components on a surface of the integrated circuit substrate, etc.). Inductors, resistors, and capacitors in circuits M1, M2, M3, and M4 may be fixed and/or adjustable. Circuits M1, M2, M3, and M4 may have control inputs 170 that receive control signals ctrl from shared control interface circuitry 110 (FIG. 3). Control signals ctrl may adjust the impedance (e.g., capacitance, inductance, etc.) of circuits M1, M2, M3, and M4 to tune the response of antenna 40. As an example, real time sensor measurements made using sensor circuitry in input-output devices 32 (FIG. 2) may be used to determine how to make appropriate adjustments to tunable circuits M1, M2, M3, and M4 (e.g., adjustments to enhance wireless performance, adjustment to satisfy limits on transmitted power, adjustments to prevent undesired interference, etc.).

If desired, one of circuits M1, M2, M3, and M4 may include a radio-frequency coupler for gathering antenna impedance information. In the example of FIG. 4, circuit M1 may include a directional coupler that conveys forward and reverse (reflected) signals on line 146 to receiver 104 (FIG. 3) over path 113 for gathering antenna impedance information associated with antenna 40. The antenna impedance information may, if desired, be used in determining how to tune antenna 40 and circuits M1, M2, M3, and M4.

Integrated circuit 106 may be implemented using a semiconductor device such as a silicon integrated circuit (e.g., a silicon-on-insulator circuit, etc.). Integrated circuit 106 may include switching circuitry, control circuitry, storage (e.g., registers for storing adjustable component settings), and communications interface circuitry such as shared interface circuitry 110 (FIG. 3). Some components of integrated circuit 106 (e.g., discrete surface mount technology components such as SMT inductors or capacitors) may, if desired, be implemented using separate components mounted on a common printed circuit. The use of a common integrated circuit to implement some or all of tuning circuits 108 may help avoid unnecessary duplication of device components and may minimize space requirements for incorporating sensors into tunable circuits for wireless circuitry 34.

The example of FIG. 4 is merely illustrative and, in general, circuits M1, M2, M3, and M4 may be arranged in any desired manner between interconnects 152, 154, 156, and 158. More than four tuning circuits 108 or fewer than four tuning circuits 108 may be provided if desired. The same control signals ctrl may be provided to each tuning circuit 108 on integrated circuit 106 by shared interface circuitry 110, for example.

Figure 5:
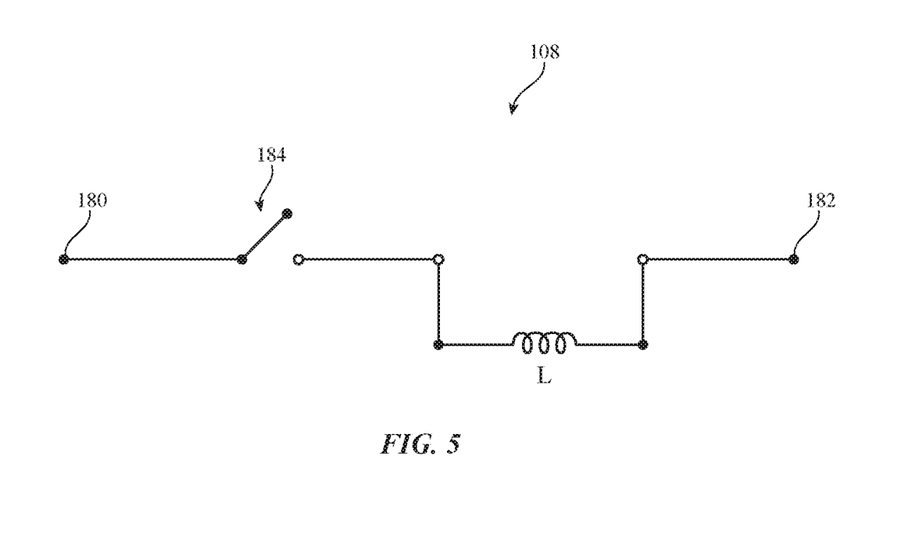
FIG. 5 is a diagram of an illustrative switchable inductor that may be used in tunable impedance matching circuitry in accordance with an embodiment.

FIG. 5 is an example of a switchable inductor that may be used in forming one or more tuning circuits 108 on integrated circuit 106. As shown in FIG. 5, a switch 184 may be coupled in series with inductor L between terminals 180 and 182. When switch 184 is closed, inductor L may contribute a corresponding inductance between terminals 180 and 182. When switch 184 is open, an open circuit may be formed between terminals 180 and 182. Switch 184 may be toggled (e.g., using control signals ctrl) to adjust the overall impedance of the tuning circuitry on integrated circuit 106 (e.g., for tuning the response of antenna 40). When configured in this way, adjustable component 108 may sometimes be referred to herein as a switchable inductor or adjustable inductor. If desired, inductor L may be a surface mount component mounted to a surface of integrated circuit 106 or mounted to another substrate external to integrated circuit 106 that is coupled to switch 184 within integrated circuit 106. This is merely illustrative. If desired, two or more inductors may be coupled between terminals 180 and 182 (e.g., in series with corresponding switches).

Figure 6:
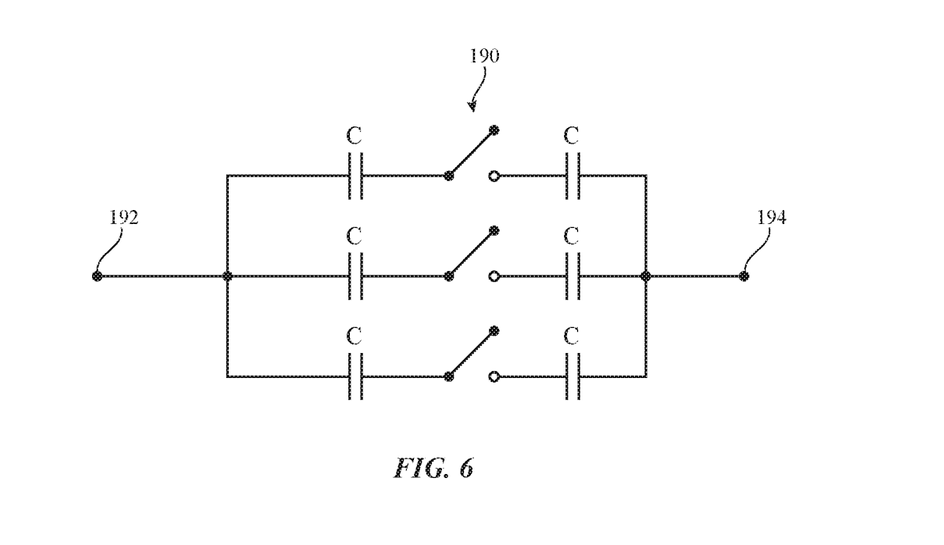
FIG. 6 is a diagram of illustrative adjustable capacitor circuitry that may be used in tunable impedance matching circuitry in accordance with an embodiment.

FIG. 6 is an example of switchable capacitor circuitry that may be used in forming one or more tuning components 108 on integrated circuit 106. As shown in FIG. 6, multiple switches 190 may be coupled in parallel between terminals 192 and 194. Capacitors C may be coupled in series between each switch 190 and terminal 192 and between each switch 190 and terminal 194, for example. Control signals ctrl may open and close switches 190 to provide a desired capacitance (e.g., series and/or parallel capacitances) between terminals 192 and 194. When all of switches 190 are open, an open circuit may be formed between terminals 192 and 194. Switches 190 may be toggled to adjust the overall impedance of the tuning circuitry (impedance matching circuitry) on integrated circuit 106 (e.g., for tuning the response of antenna 40). When configured in this way, adjustable component 108 may sometimes be referred to herein as a switchable capacitor or adjustable capacitor. This is merely illustrative. In general, any desired number of capacitors and switches may be coupled between terminals 192 and 194 in any manner (e.g., in series and/or in parallel).

Components such as the switchable inductor of FIG. 5, the switchable capacitor of FIG. 6, a directional coupler or other impedance sensor, and other components may be used in forming tuning circuits 108 on integrated circuit 106. In one suitable arrangement, in the example of FIG. 4, an adjustable inductor of the type shown in FIG. 5 may be used to form circuits M2 and/or M4 (e.g., where terminal 180 is coupled to circuits M1 and M3 and terminal 182 is coupled to feed terminal 142 or where terminal 180 is coupled to circuit M2 and feed terminal 142 and terminal 182 is coupled to ground line 148), an adjustable capacitor of the type shown in FIG. 6 may be used to form circuits M2, M3, and/or M4, and an impedance sensor such as a directional coupler may be used to form circuit M1 of FIG. 4. Other arrangements may be used if desired.

Figure 7:
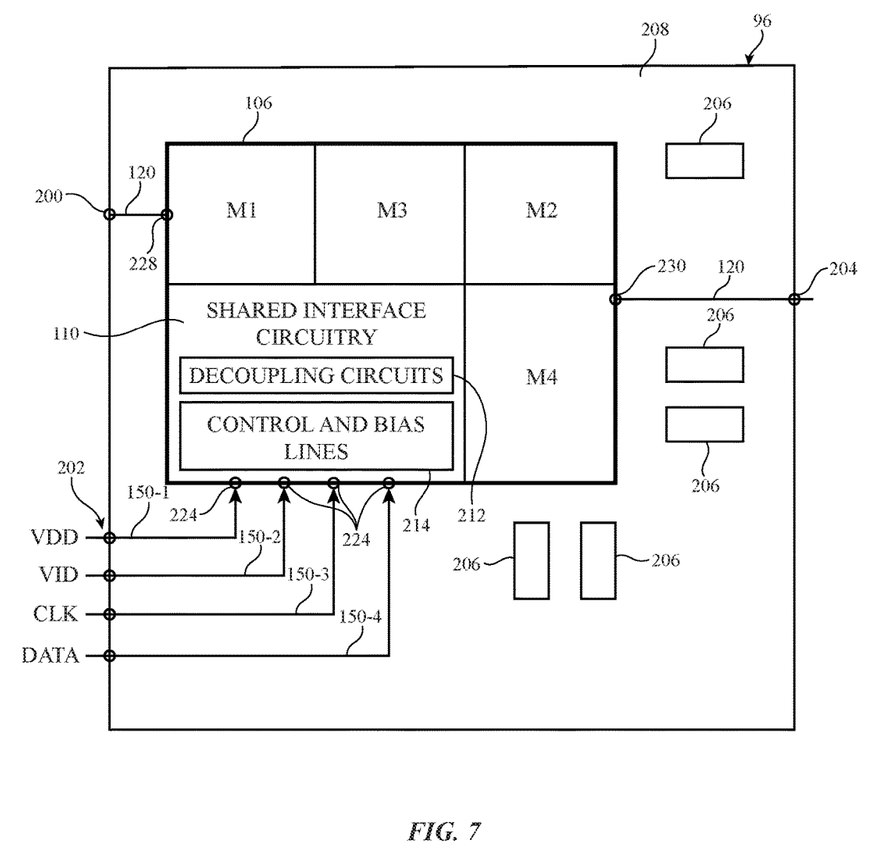
FIG. 7 is a diagram of an illustrative antenna tuning integrated circuit that may include multiple antenna tuning circuits and shared control interface circuitry in accordance with an embodiment.

FIG. 7 is a diagram showing how tuning IC 106 may be formed within front end circuitry 96 of FIG. 3. As shown in FIG. 7, front end circuitry 96 may include a substrate such as substrate 208. Substrate 208 may be, for example, a rigid or flexible printed circuit board, an epoxy substrate, a laminate sheet (e.g., a sheet of FR-4 material), a plastic substrate, a glass substrate, a ceramic substrate, or other substrate structures. When integrated circuit 106 is mounted to substrate 208, substrate 208 and integrated circuit 106 may form an integrated tuning module for antenna 40.

Additional components 206 (e.g., components that are not formed on integrated circuit 106) may be formed on substrate 206. Components 206 may include inductors, resistors, capacitors, switches, or filters that are used for forming tuning circuits 108 (e.g., tuning circuits having components that are also formed on integrated circuit 106 or tuning circuits that are entirely external to integrated circuit 106) or may include other components (e.g., amplifier circuitry, converter circuitry, sensor circuitry, etc.).

Tuning circuits M1, M2, M3, and M4 of FIG. 4 and shared control interface circuitry 110 (FIG. 3) may be formed on integrated circuit 106. Portions of transmission line 120 may be formed on substrate 208. For example, a first portion of transmission line 120 may be coupled between conductive interconnects 200 on substrate 208 and conductive interconnects 228 on integrated circuit 106. Conductive interconnects 228 may, for example, include positive and ground interconnects 152 and 154 of FIG. 4. Conductive interconnects 200 may be coupled to radio-frequency transceiver circuitry 90 (FIG. 3). A second portion of transmission line 120 may be coupled between conductive interconnects 230 on integrated circuit 106 and conductive interconnects 204 on substrate 208. Conductive interconnects 230 may, for example, include positive and ground interconnects 156 and 158 of FIG. 4. Conductive interconnects 204 may be coupled to feed 140 of antenna 40 (e.g., interconnects 200 and 204 may each include two conductive interconnect structures, one coupled to positive line 146 and the other coupled to ground line 148 of transmission line 120).

Transceiver circuitry 90 may convey radio-frequency signals for transmission to antenna 40 over interconnects 200, the first portion of transmission line 120, interconnects 228, tuning components M1-M4 of integrated circuit 106, interconnects 230, the second portion of transmission line 120, and interconnects 204. Similarly, transceiver circuitry 90 may receive radio-frequency signals from antenna 40 over interconnects 204, the second portion of transmission line 120, interconnects 230, components M4-M1 of integrated circuit 104, interconnects 228, the first portion of transmission line 120, and interconnects 200.

Substrate 208 may include conductive control interconnects 202 that receive control signals ctrl from tuning controller 100 (FIG. 3). Control paths 150 may be coupled between interconnects 202 and control interconnects 224 on shared interface circuitry 110 of integrated circuit 106. In the example of FIG. 7, control signals ctrl include a bias voltage VDD, an interface I/O voltage VID, a clock signal CLK, and a data signal DATA. In general, control signals ctrl may include any desired signals for controlling the operation of tuning circuits 108 on integrated circuit 106.

Control paths 150 may include a first control path 150-1 that conveys bias voltage VDD from tuning controller 100 to shared interface circuitry 110 via interconnects 202 and 224, a second control path 150-2 that conveys interface I/O voltage VID from tuning controller 100 to shared interface circuitry 110 via interconnects 202 and 224, a third control path 150-3 that conveys clock signal CLK from tuning controller 100 to shared interface circuitry 110 via interconnects 202 and 224, and a fourth control path 150-4 that conveys a control data signal DATA from tuning controller 100 to shared interface circuitry 110 via interconnects 202 and 224.

Conductive interconnects 200, 202, 228, 230, 224, and 204 may include any desired conductive interconnect structures. For example, conductive interconnects 200, 202, 228, 230, 224, and 204 may include conductive contact pads, solder balls, micro bumps, conductive pins, solder, conductive adhesive, conductive wires, vertical conductive vias (e.g., through-silicon vias), conductive springs, conductive welds, conductive housing structures, combinations of these, or any other desired conductive structures.

Shared interface circuitry 110 may serve as a control interface for and may route the same control signals VDD, VID, CLK, and DATA to each of tuning circuits M1, M2, M3, and M4 on integrated circuit 106. In this way, the state of tuning circuits M1, M2, M3, and M4 may be controlled using the same shared control signals. Shared interface circuitry 110 may include decoupling circuitry such as decoupling circuits 212 that are shared by each of tuning circuits M1, M2, M3, and M4. For example, the same decoupling circuits 212 may be used to decouple the same control signals that are provided to each of tuning circuits M1, M2, M3, and M4. Shared interface circuitry 110 may include shared control and bias lines 214. Lines 214 may include, for example, conductive traces in or on integrated circuit 106. Lines 214 may route control signals VDD, VID, CLK, and DATA to each of tuning circuits M1, M2, M3, and M4 (e.g., such that the control signals have each, when received at components M1, M2, M3, or M4, passed through the same decoupling circuits 212 and the same segments of lines 214 on integrated circuit 106). Control signals VDD, VID, CLK, and DATA may be provided at relatively low frequencies (e.g., frequencies that are less than the radio-frequencies with which signals are conveyed over transmission lien 120). In this way, control interface resources such as decoupling circuits 212 and lines 214 may be shared between each of the tuning components 108 on integrated circuit 106, thereby reducing the area required for forming and controlling tuning circuits M1-M4 on integrated circuit 106 relative to scenarios where separate control interface resources are used for each tuning circuit.

Figure 8:
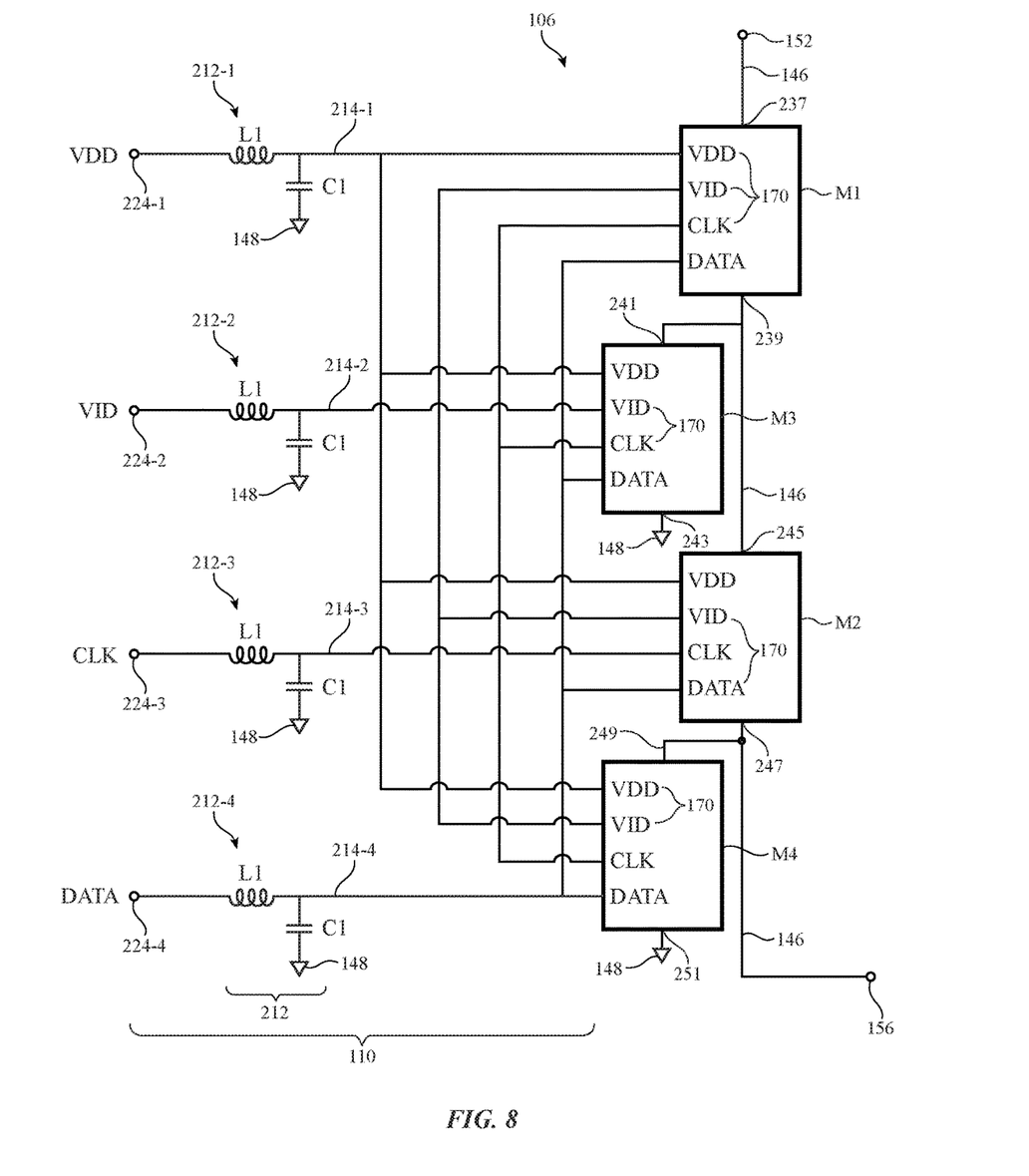
FIG. 8 is a circuit diagram of illustrative shared control interface circuitry for multiple antenna tuning circuits in accordance with an embodiment.

FIG. 8 is a circuit diagram showing how shared interface circuitry 110 may route control signals VDD, VID, CLK, and DATA to tuning circuits M1-M4 of integrated circuit 106. As shown in FIG. 8, tuning circuits M1, M2, M3, and M4 may each have an input, an output, and one or more control inputs (e.g., four control inputs). Tuning circuit M1 may have a first radio-frequency terminal (port) 237 coupled to conductive interconnect 152 via signal conductor 146 of transmission line 120. Tuning circuit M1 may have a second radio-frequency terminal 239 coupled to first radio-frequency terminal 241 of tuning circuit M3 and first radio-frequency terminal 245 of tuning circuit M2. Tuning circuit M3 may have a second radio-frequency terminal 243 coupled to ground 148. Tuning circuit M2 may have a second radio-frequency terminal 247 coupled to first radio-frequency terminal 249 of tuning circuit M4 and to interconnect 156. Tuning circuit M4 may have a second radio-frequency terminal 251 coupled to ground 148.

Shared control interface circuitry 110 may serve as an interface between control paths 150 (FIG. 7) and the control inputs of tuning components M1-M4. As shown in FIG. 8, shared interface circuitry 110 may be coupled to control paths 150 on substrate 208 (FIG. 7) via shared conductive interconnects 224. In the example of FIG. 8, a first shared interconnect 224-1 is coupled to control path 150-1, a second shared interconnect 224-2 is coupled to control path 150-2, a third shared interconnect 224-3 is coupled to control path 150-3, and a fourth shared interconnect 224-4 is coupled to control path 150-4.

Shared interface circuitry 110 may include shared decoupling circuits 212 coupled to corresponding interconnects 224. For example, interface circuitry 110 may include a first shared decoupling circuit 212-1 coupled to interconnect 224-1, a second shared decoupling circuit 212-2 coupled to interconnect 224-2, a third shared decoupling circuit 212-3 coupled to interconnect 224-3, and a fourth shared decoupling circuit 212-4 coupled to interconnect 224-4. Each shared decoupling circuit 212 may include decoupling inductors and/or capacitors. In the example of FIG. 8, each decoupling circuit 212 includes an inductor L1 coupled in series with the corresponding interconnect 224 and a shunt-connected capacitor C1 coupled to ground 148. Each decoupling circuit 212 may include inductors and capacitors having the same inductances and capacitances or may include different inductors and capacitors arranged in different manners if desired. Decoupling circuitry may include any other desired circuit components arranged in any desired manner.

Shared interface circuitry 110 may include shared conductive control lines 214 coupled between a corresponding decoupling circuit 212 and a control input on each of tuning circuits M1-M4. For example, interface circuitry 110 may include first conductive lines 214-1 coupled between decoupling circuit 212-1 and a first control input (VDD) of tuning circuits M1-M4, second conductive lines 214-2 coupled between decoupling circuit 212-2 and a second control input (VID) of tuning circuits M1-M4, third conductive lines 214-3 coupled between decoupling circuit 212-3 and a third control (e.g., clock) input (CLK) of tuning circuits M1-M4, and fourth conductive lines 214-4 coupled between decoupling circuit 212-4 and a fourth control (e.g., data) input (DATA) of tuning circuits M1-M4.

During radio-frequency transmission, radio-frequency transceiver circuitry 90 may transmit radio-frequency signals over transmission line 120. The radio-frequency signals may be conveyed to radio-frequency terminal 237 via interconnect 152 and path 146. In this way, terminal 237 may serve as a radio-frequency input terminal for circuit M1. Circuit M1 may filter or perform other operations on the radio-frequency signals (e.g., based on a configuration determined by the control inputs of circuit M1) and may output the radio-frequency signals at terminal 239 (e.g., a radio-frequency output terminal for circuit M1).

Tuning circuit M3 may receive the radio-frequency signals at terminal 241 (e.g., a radio-frequency input terminal for circuit M3), may perform corresponding filtering operations, and may output the radio-frequency signals to ground 148 via terminal 243 (e.g., a radio-frequency output terminal for circuit M3). Tuning circuit M2 may also receive the radio-frequency signals at terminal 245 (e.g., a radio-frequency input terminal for circuit M2), may perform corresponding filtering operations, and may output the radio-frequency signals to feed terminal 142 on antenna 40 (FIG. 4) via interconnect 156 and to terminal 249 of circuit M4. Tuning circuit M4 may perform corresponding filtering operations on the signals and may short the signals to ground 148 over radio-frequency terminal 148.

During radio-frequency reception, radio-frequency signals are conveyed from antenna 40 to integrated circuit 106 over interconnect 156. In this scenario, terminals 249, 247, 241, and 239 may serve as radio-frequency input terminals for tuning circuits M4, M2, M3, and M1, respectively. Tuning circuits M1-M4 may perform corresponding filtering operations and may pass the radio-frequency signals to transceiver circuitry 90 over path 146 and interconnect 152. In one suitable arrangement, circuit M1 may include radio-frequency coupler circuitry that passes transmit and reflected signals to receiver 104 over path 113 (FIG. 3) (e.g., for performing antenna impedance measurements).

The operations of tuning circuits M1-M4 may be controlled using control signals ctrl received over interconnects 224. For example, bias voltage VDD may be received by interconnect 224-1 from tuning controller 100 via control line 150-1. Decoupling circuitry 212-1 may reduce (decouple) noise from bias voltage VDD or may perform other filtering operations. The decoupled bias voltage VDD may be routed to the VDD control input on each of circuits M1, M2, M3, and M4 over conductive lines 214-1 (e.g., where signal VDD is conveyed over at least a segment of lines 214-1 before being received by each of circuits M1-M4). In this way, bias voltage VDD may traverse at least a segment of conductive lines 214-1, decoupling circuit 214-1, and interconnect 224-1 before being received by each of circuits M1-M4 (e.g., decoupling circuit 212-1, interconnect 224-1, and at least a segment of lines 214-1 may be shared by each tuning circuit M1-M4). Bias voltage VDD may be used to power switching circuitry or other active components within tuning circuits M1-M4. Lines 214-1 may sometimes be referred to herein as (shared) biasing lines, power lines, or bias voltage lines.

Interface I/O voltage VID may be received by interconnect 224-2 from tuning controller 100 via control line 150-2. Decoupling circuitry 212-2 may reduce (decouple) noise from interface I/O voltage VID or may perform other filtering operations. The decoupled interface I/O voltage VID may be routed to the VID control input on each of circuits M1, M2, M3, and M4 over conductive lines 214-2 (e.g., where signal VID is conveyed over at least a segment of lines 214-2 before being received by each of circuits M1-M4). In this way, interface I/O voltage VID may traverse at least a segment of conductive lines 214-2, decoupling circuit 214-2, and interconnect 224-2 before being received by each of circuits M1-M4 (e.g., decoupling circuit 212-2, interconnect 224-2, and at least a segment of lines 214-2 may be shared by each tuning circuit M1-M4).

Clock signal CLK may be received by interconnect 224-3 from tuning controller 100 via control line 150-3. Tuning controller 100 may, for example, include phase-locked loop circuitry, oscillator circuitry, or other clock circuitry that generates clock signal CLK (sometimes referred to herein as clocking signal CLK). Decoupling circuitry 212-3 may reduce (decouple) noise from clock signal CLK or may perform other filtering operations. The decoupled clock signal CLK may be routed to the CLK control input (sometimes referred to herein as a clock input or clocking input) on each of circuits M1, M2, M3, and M4 over conductive lines 214-3 (e.g., where signal CLK is conveyed over at least a segment of lines 214-3 before being received by each of circuits M1-M4). In this way, clock signal CLK may traverse at least a segment of conductive lines 214-3, decoupling circuit 214-3, and interconnect 224-3 before being received by each of circuits M1-M4 (e.g., decoupling circuit 212-3, interconnect 224-3, and at least a segment of lines 214-3 may be shared by each tuning circuit M1-M4). Clock signal CLK may serve to clock the active components of circuits M1-M4, for example. Conductive lines 214-3 may sometimes be referred to as clocking lines or clocking paths (e.g., clocking lines that are shared by tuning circuits M1-M4).

Control data signal DATA may be received by interconnect 224-4 from tuning controller 100 via control line 150-4. Decoupling circuitry 212-4 may reduce (decouple) noise on data signal DATA or may perform other filtering operations. The decoupled data signal DATA may be routed to the DATA control input (sometimes referred to herein as a control data input) on each of circuits M1, M2, M3, and M4 over conductive lines 214-4 (e.g., where signal DATA is conveyed over at least a segment of lines 214-4 before being received by each of circuits M1-M4). In this way, data signal DATA may traverse at least a segment of conductive lines 214-4, decoupling circuit 214-4, and interconnect 224-4 before being received by each of circuits M1-M4 (e.g., decoupling circuit 212-4, interconnect 224-4, and at least a segment of lines 214-4 may be shared by each tuning circuit M1-M4).

Interface circuitry 110 may include digital and/or analog circuitry. For example, interface circuitry 110 may convey analog control signals to circuits M1-M4 or may convey digital control signals to circuits M1-M4. In scenarios where interface circuitry 110 includes digital circuitry, data signal DATA may include a stream or sequence of digital data bits. The particular sequence of digital data bits may identify a state of tuning IC 106 to be used (e.g., states for each of circuits M1-M4 to be used). Tuning controller 100 may, for example, generate data signal DATA to include a particular sequence of digital data bits to place tuning circuits M1-M4 in desired states. As one example, when data signal DATA includes a first set of data bits, components M1, M2, M3, and M4 may be configured to exhibit a first set of impedances and components M1, M2, M3, and M4 may be configured to exhibit a second set of impedances when data signal DATA includes a second set of data bits. In scenarios where interface circuitry 110 includes analog circuitry, data signal DATA may be an analog signal that controls the state of circuits M1-M4. In another suitable arrangement, analog-to-digital converter circuitry and/or digital-to-analog converter circuitry may be provided within interface circuitry 110 for converting control signals ctrl between digital and analog domains (e.g., interface circuitry 112 may include analog-to-digital and/or digital-to-analog converter circuitry that is shared by each of circuits M1-M4).

The example of FIG. 8 is merely illustrative. In general, tuning controller 100 may adjust bias voltage VDD, interface I/O voltage VID, clock signal CLK, and/or data signal DATA to adjust the impedance provided by each component M1-M4 and thus the impedance provided by tuning IC 106 (e.g., to adjust the frequency response or impedance of antenna 40). Fewer, additional, or other control signals may be used to control the states of tuning circuits M1-M4 if desired. Fewer or additional tuning circuits 108 may be formed on integrated circuit 120 and may be arranged in any desired manner. In general, each control signal may have a corresponding interconnect 224, decoupling circuit 212, and conductive control lines 214 that are shared by each of the tuning circuits on integrated circuit 106. By sharing control interface circuitry 110 for conveying control signals from tuning controller 100 to each tuning component 108 on integrated circuit 106, the amount of space required within integrated circuit 106 and thus device 10 for controlling the tuning of antenna 40 may be significantly reduced relative to scenarios where separate interface circuits (e.g., separate decoupling circuits, interconnects, and conductive control lines) are used to convey the control signals to each tuning circuit 108 on integrated circuit 106.

Control circuitry in device 10 may be configured to perform operations in device 10 using hardware (e.g., dedicated hardware or circuitry), firmware and/or software. Software code for performing operations (e.g., radio-frequency communications and antenna tuning operations) in device 10 is stored on non-transitory computer readable storage media (e.g., tangible computer readable storage media) in control circuitry 30 and/or 100. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 30 and/or 100. The processing circuitry may include application-specific integrated circuits with processing circuitry, one or more microprocessors, a central processing unit (CPU) or other processing circuitry.

The foregoing is merely illustrative and various modifications can be made by those skilled in the art without departing from the scope and spirit of the described embodiments. The foregoing embodiments may be implemented individually or in any combination.

What is claimed is:

1. An antenna tuning integrated circuit, comprising:
    a first antenna tuning circuit;
    a second antenna tuning circuit; and
    shared control interface circuitry coupled to the first and second antenna tuning circuits, wherein the shared control interface circuitry is configured to receive a control signal from a tuning controller external to the antenna tuning integrated circuit and to adjust the first and second tuning circuits by conveying the control signal to both the first and second tuning circuits.

2. The antenna tuning integrated circuit defined in claim 1, wherein the shared control interface circuitry comprises:
    a decoupling circuit, wherein the shared control interface circuitry is configured to convey the control signal to both the first and second antenna tuning circuits through the decoupling circuit.

3. The antenna tuning integrated circuit defined in claim 2, wherein the shared control interface circuitry further comprises:
    a control line coupled between the decoupling circuit and the first and second antenna tuning circuits, wherein the shared control interface circuitry is configured convey the control signal to a first control input on the first antenna tuning circuit and to a second control input on the second antenna tuning circuit through the control line.

4. The antenna tuning integrated circuit defined in claim 3, wherein the decoupling circuit comprises an inductor coupled in series with the control line and a shunt capacitor coupled between the control line and a ground conductor.

5. The antenna tuning integrated circuit defined in claim 1, wherein the first antenna tuning circuit has a first radio-frequency terminal configured to receive radio-frequency signals from transceiver circuitry external to the antenna tuning integrated circuit and a second radio-frequency terminal coupled to a third radio-frequency terminal on the second antenna tuning circuit, the first antenna tuning circuit has a first control input and the second antenna tuning circuit has a second control input, and the shared control interface circuitry is configured to convey the control signal to both the first and second control inputs.

6. The antenna tuning integrated circuit defined in claim 5, wherein the control signal comprises a bias voltage that powers active circuitry within the first and second antenna tuning circuits.

7. The antenna tuning integrated circuit defined in claim 5, wherein the control signal comprises a clocking signal that clocks the first and second antenna tuning circuits.

8. The antenna tuning integrated circuit defined in claim 5, wherein the control signal comprises a series of digital data bits that configure the first and second tuning circuits to exhibit a first set of impedances.

9. The antenna tuning integrated circuit defined in claim 5, wherein the first antenna tuning circuit has a third control input and the second antenna tuning circuit has a fourth control input, wherein the shared control interface circuitry is configured to receive an additional control signal from the tuning controller and to adjust the first and second tuning circuits by conveying the additional control signal to both the third and fourth control inputs.

10. Apparatus, comprising:
   antenna structures that transmit and receive wireless signals;
   a tuning controller configured to generate a control signal;
   an integrated circuit coupled to the antenna structures and the tuning controller, wherein the integrated circuit comprises:
      a plurality of adjustable tuning components, wherein each adjustable tuning component in the plurality of adjustable tuning components is configured to adjust the antenna structures based on the control signal; and
      a decoupling circuit coupled to respective control inputs on each adjustable tuning component in the plurality of tuning components, wherein the tuning controller is configured to convey the control signal to each of the control inputs through the decoupling circuit.

11. The apparatus defined in claim 10, further comprising:
   a substrate, wherein the integrated circuit is mounted to the substrate; and
   a control line on the substrate and external to the integrated circuit, wherein the tuning controller is configured to convey the control signal to the decoupling circuit over the control line on the substrate.

12. The apparatus defined in claim 10, further comprising:
   radio-frequency transceiver circuitry coupled to the integrated circuit, wherein the plurality of adjustable tuning components comprises an adjustable component coupled in series between the antenna structures and the radio-frequency transceiver circuitry and the adjustable component is selected from the group consisting of: an adjustable inductor and an adjustable capacitor.

13. The apparatus defined in claim 12, wherein the radio-frequency transceiver circuitry is configured to transmit a radio-frequency signal to the antenna structures through the integrated circuit and the integrated circuit further comprises:
   a radio-frequency coupler that is configured to convey the transmitted radio-frequency signal and a reflected version of the transmitted radio-frequency signal to a receiver in the radio-frequency transceiver circuitry over a feedback path, wherein the tuning controller is configured to convey the control signal to the radio-frequency coupler through the decoupling circuit.

14. The apparatus defined in claim 13, wherein the tuning controller is configured to identify antenna impedance information based on the transmitted radio-frequency signal and the reflected version of the transmitted radio-frequency signal conveyed to the receiver by the radio-frequency coupler and the tuning controller is configured to adjust the control signal based on the identified antenna impedance information.

15. The apparatus defined in claim 14, further comprising:
   a first additional integrated circuit that is different from the integrated circuit, wherein the transceiver circuitry is formed on the first additional integrated circuit; and
   a second additional integrated circuit that is different from the integrated circuit and the first additional integrated circuit, wherein the tuning controller is formed on the second additional integrated circuit.

16. The apparatus defined in claim 10, wherein each adjustable tuning component in the plurality of adjustable tuning components comprises a respective switch and the control signal comprises a bias voltage that is provided to each adjustable tuning component in the plurality of adjustable tuning component to power the respective switches.

17. The apparatus defined in claim 10, wherein the control signal comprises a clocking signal, the integrated circuit further comprising:
   a clocking line coupled between the decoupling circuit and each of the control inputs, wherein the clocking line is configured to convey the clocking signal from the decoupling circuit to each of the control inputs.

18. The apparatus defined in claim 10, wherein the integrated circuit comprises an additional decoupling circuit, the tuning controller is configured to generate an additional control signal, and the tuning controller is configured to convey the additional control signal to each adjustable tuning component in the plurality of adjustable tuning components through the additional decoupling circuit.

19. An electronic device comprising:
   radio-frequency transceiver circuitry;
   an antenna that transmit and receive wireless signals;
   a controller that generates a bias voltage; and
   an integrated circuit coupled to the controller and coupled between the antenna and the radio-frequency transceiver circuitry, the integrated circuit comprising:
      a first tunable component having a first control input,
      a second tunable component having a second control input,
      a third tunable component having a third control input, wherein the first, second, and third tunable components are configured to adjust a frequency response of the antenna, and
      a conductive line that conveys the bias voltage from the controller to each of the first, second, and third control inputs, wherein the first, second, and third tunable components each comprise switching circuitry that is powered by the bias voltage.

20. The electronic device defined in claim 19, wherein the integrated circuit further comprises:
   a ground conductor, wherein the first adjustable tuning component is coupled in series between the radio-frequency transceiver circuitry and the antenna, the second adjustable tuning component is coupled between a first side of the first adjustable tuning component and the ground conductor, and the third adjustable tuning component is coupled between a second side of the adjustable tuning component and the ground conductor.

* * * * *

UNITED STATES PATENT AND TRADEMARK OFFICE
CERTIFICATE OF CORRECTION

PATENT NO. : 10,498,012 B2
APPLICATION NO. : 15/655251
DATED : December 3, 2019
INVENTOR(S) : James G. Judkins et al.

It is certified that error appears in the above-identified patent and that said Letters Patent is hereby corrected as shown below:

In the Claims

Column 18, Line 48, "interface circuitry is configured convey" should read -- interface circuitry is configured to convey --

Column 20, Line 38, "antenna that transmit and receive wireless signals" should read -- antenna that transmits and receives wireless signals --

Signed and Sealed this
Twenty-fifth Day of February, 2020

Andrei Iancu
*Director of the United States Patent and Trademark Office*